US012042917B2

(12) United States Patent
Costello

(10) Patent No.: US 12,042,917 B2
(45) Date of Patent: Jul. 23, 2024

(54) RECHARGEABLE BATTERY-OPERATED PLIER STAPLER DEVICE

(71) Applicant: Patrick Costello, Clinton, IL (US)

(72) Inventor: Patrick Costello, Clinton, IL (US)

( * ) Notice: Subject to any disclaimer, the term of this patent is extended or adjusted under 35 U.S.C. 154(b) by 0 days.

(21) Appl. No.: 17/933,904

(22) Filed: Sep. 21, 2022

(65) Prior Publication Data

US 2023/0249325 A1 Aug. 10, 2023

Related U.S. Application Data

(60) Provisional application No. 63/308,596, filed on Feb. 10, 2022.

(51) Int. Cl.
*B25C 5/10* (2006.01)
*B25C 5/16* (2006.01)

(52) U.S. Cl.
CPC .............. *B25C 5/10* (2013.01); *B25C 5/1606* (2013.01)

(58) Field of Classification Search
CPC ........... B25C 7/00; B25C 5/15; B25C 5/0271; B25C 3/00; B25C 3/10; B25C 3/15; B25C 5/10; B25C 5/1606; B25C 5/1613
See application file for complete search history.

(56) References Cited

U.S. PATENT DOCUMENTS 5,575,415 A * 11/1996 Sucher .................. B25C 5/1686 227/120
6,012,623 A * 1/2000 Fealey ...................... B25C 5/11 227/139
6,753,673 B2 * 6/2004 Shiue ....................... H03K 3/53 320/117
2003/0214270 A1 * 11/2003 Shiue ....................... H03K 3/53 320/166
2008/0073405 A1 * 3/2008 Shima ....................... B25C 1/06 227/129
2008/0179371 A1 * 7/2008 Gardner .................... B25C 5/15 227/1
2011/0148437 A1 * 6/2011 Lawrence .............. B25C 1/047 340/686.1
2012/0187175 A1 * 7/2012 Wu ......................... B25C 1/047 227/8

(Continued)

FOREIGN PATENT DOCUMENTS

WO WO-03013799 A1 * 2/2003 ............ B25C 1/005

*Primary Examiner* — Thomas M Wittenschlaeger
(74) *Attorney, Agent, or Firm* — Brennan, Manna & Diamond, LLC

(57) ABSTRACT

The present invention relates to a battery-operated non pneumatic plier stapler for accurately and effectively applying staple fasteners onto a surface. The plier stapler includes a rechargeable battery pack secured into a battery slot for providing electric power to a driver piston assembly. The battery pack is removably mounted to the battery socket and can be replaced with another battery pack. The stapler further includes a laser sight to indicate precise staple placement during application, thereby enabling accurate stapling operation. A magazine stores staples and the staples are biased towards nose using springs and rollers. The clencher clutches legs of individual staples to finish the stapling process. The stapler is cordless and obviates the need to use air compressors to apply staples, thereby eliminating limits on movement, air supply, and other factors.

19 Claims, 6 Drawing Sheets

(56) References Cited

U.S. PATENT DOCUMENTS

| | | | | |
|---|---|---|---|---|
| 2019/0351537 | A1* | 11/2019 | Chou | B25C 5/1696 |
| 2020/0086469 | A1* | 3/2020 | Friedman | B25C 5/13 |
| 2020/0376645 | A1* | 12/2020 | Davis | H04M 1/72415 |

* cited by examiner

RECHARGEABLE BATTERY-OPERATED PLIER STAPLER DEVICE

CROSS-REFERENCE TO RELATED APPLICATION

The present application claims priority to, and the benefit of, U.S. Provisional Application No. 63/308,596, which was filed on Feb. 10, 2022 and is incorporated herein by reference in its entirety.

FIELD OF THE INVENTION

The present invention relates generally to the field of plier staplers. More specifically, the present invention relates to a unique non-pneumatic electric battery-operated cordless plier stapler. The stapler is a rechargeable plier stapler for accurately applying staples to a variety of surfaces. The stapler features several rechargeable battery packs that can be secured to the stapler gun to power the internal piston driver mechanism and includes a laser sight to indicate precise staple placement during application of the stapler. The stapler obviates limits on movement, air supply, and other factors in a workplace to effectively apply staple fasteners. Accordingly, the present disclosure makes specific reference thereto. Nonetheless, it is to be appreciated that aspects of the present invention are also equally applicable to other like applications, devices, and methods of manufacture.

BACKGROUND

By way of background, traditional pneumatic plier staplers are used for applying staples on a variety of surfaces including, but not limited to, paper, cardboard, upholstery fabrics, and more. Traditional pneumatic plier staplers use a compressed air source for applying force by a user to staple onto a surface. The pneumatic plier staplers consist of mechanical components and require regular servicing to maintain proper upkeep via oil, cleaning, and more. Irregular service can lead to malfunctioning of plier stapler and therefore require expensive repairs.

In fact, air pressure used in pneumatic plier staplers should be consistent, however, air pressure can be ambiguous when the stapler is connected to a compressor. Inconsistent air pressure can damage the tool and further, producing compressed air in a facility is costly and makes the production process expensive. Individuals desire improved plier staplers that do not use air pressure to power internal piston driver mechanism of a plier stapler. When it comes to electric versus pneumatic tools there are dramatic differences in strength, cost, and conveniences. They both also have their own limitations; pneumatics require an air compressor to deliver power to the tool, and electrics need a cord or a battery.

A common problem with pneumatic plier staplers is the occurrence of incorrectly applied staples. A user using such staplers approximates the position of applying staples manually and therefore results in inaccurate positioning of staples. Individuals desire improved staplers that can accurately apply and position staples on a variety of surfaces.

Therefore, there exists a long felt need in the art for a plier stapler that accurately applies and positions staples on a variety of surfaces. There is also a long felt need in the art for an improved plier stapler that does not use an air compressor for providing force to apply staples. Additionally, there is a long felt need in the art for a plier stapler that eliminates inconsistencies in staple positioning due to ambiguous air pressure. Moreover, there is a long felt need in the art for a plier stapler that is cost-effective and easy to repair. Further, there is a long felt need in the art for a plier stapler that keeps constant pressure on staples for constant and uniform feeding of staples. Finally, there is a long felt need in the art for an improved plier stapler that obviates limits on movement, air supply, and more, to effectively apply staple fasteners.

The subject matter disclosed and claimed herein, in one embodiment thereof, comprises a battery-operated non-pneumatic plier stapler. The plier stapler does not use pneumatic air pressure and provides an effective and easy method of applying staple fasteners onto a surface. The stapler further comprising a battery socket for receiving and accommodating a rechargeable battery, the rechargeable battery is removably mounted to the battery socket and provides electric power for operation of the stapler, a laser sight for indicating precise staple placement during application of the stapler, a trigger for activating flow of electric power from the battery to the piston driver mechanism and the laser sight, and a magazine for storing a plurality of staples wherein individual staples are moved to an anvil clencher using a piston driver mechanism.

In this manner, the battery-operated plier stapler of the present invention accomplishes all of the forgoing objectives and provides users with a rechargeable plier stapler for obviating use of air compressors for applying staples in addition to including laser sight for indicating precise staple placement on any surface. The battery can be replaced with a new or recharged battery to power the internal piston driver mechanism of the stapler.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a battery-operated plier stapler. The plier stapler further comprising a battery socket for receiving and accommodating a rechargeable battery, the rechargeable battery when secured in the battery socket provides electric power for operation of the stapler, a laser sight for indicating precise staple placement during application of the stapler, a trigger for activating flow of electric power from the battery to the piston driver mechanism and the laser sight, a global positioning system (GPS) tracker for locating the plier stapler, and a magazine for storing a plurality of staples wherein individual staples are moved to an anvil clencher using a piston driver mechanism.

In yet another embodiment, the magazine includes springs coupled to a pusher for pushing the individual staples to the anvil clencher.

In yet another embodiment, the magazine is removable and is made from a metal or steel.

In yet another embodiment, the anvil clencher clutches the legs of a staple to complete the staple operation.

In yet another embodiment, the rechargeable battery is removably secured to the battery socket.

In yet another embodiment, a battery-operated plier stapler is disclosed. The stapler features a rechargeable and removable battery, a laser sight for indicating correct staple placement during use, a trigger for activating the piston driver assembly wherein the battery provides electric power to the assembly and the laser sight, a magazine for storing a plurality of staples, a global positioning system (GPS) tracker for locating the plier stapler, and an anvil having a clencher for receiving the staples and clutching the legs of the staples.

In yet another embodiment, a method for accurately applying staples to a variety of surfaces is described. The method includes the steps of providing a battery-operated plier stapler, the stapler having a piston driver assembly powered by a rechargeable battery and a laser sight for accurately indicating correct staple placement; placing, the anvil clencher of the stapler on a desired surface; activating, by triggering a trigger of the stapler, the piston driver assembly; clutching, by the clencher, legs of the staples to complete the staple operation; wherein the piston driver assembly is powered by the rechargeable battery.

The plier stapler of the present invention does not use air pressure and as a result obviates limits on movement, air supply, and other factors in a workplace to effectively apply staple fasteners.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
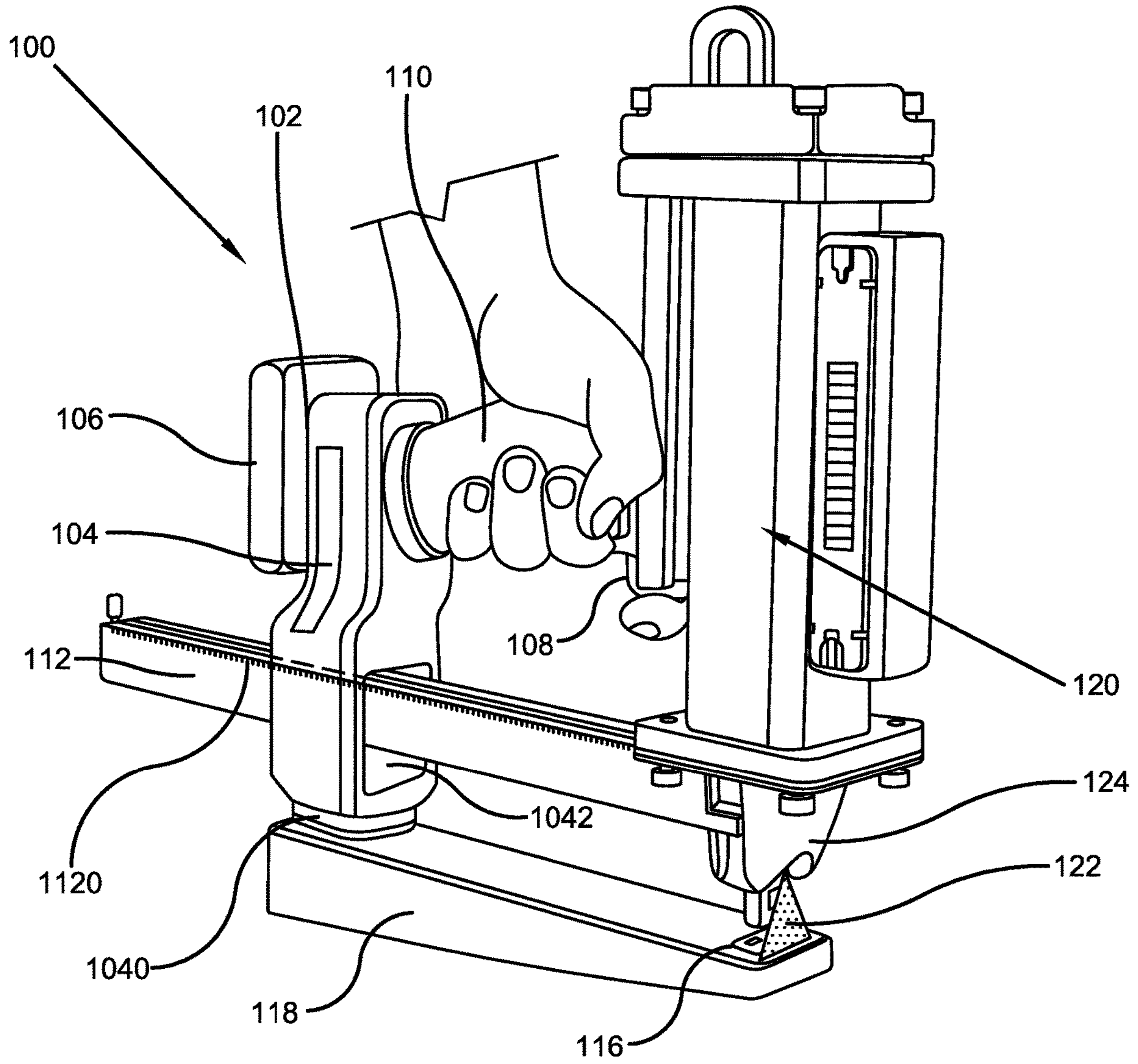
FIG. 1 illustrates a perspective view of one potential embodiment of a battery-operated plier stapler of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a plier stapler that accurately applies and positions staples on a variety of surfaces. There is also a long felt need in the art for an improved plier stapler that does not use an air compressor for providing force to apply staples. Additionally, there is a long felt need in the art for a plier stapler that eliminates inconsistencies in staple positioning due to ambiguous air pressure. Moreover, there is a long felt need in the art for a plier stapler that is cost-effective and easy to repair. Further, there is a long felt need in the art for a plier stapler that keeps constant pressure on staples for constant and uniform feeding of staples. Finally, there is a long felt need in the art for an improved plier stapler that obviates limits on movement, air supply, and more, to effectively apply staple fasteners.

The present invention, in one exemplary embodiment, is a novel battery-operated plier stapler. The stapler is non-pneumatic and features a rechargeable and removable battery, a laser sight for indicating correct staple placement during use, a trigger for activating the piston driver assembly wherein the battery provides electric power to the assembly and the laser sight, a magazine for storing a plurality of staples, a global positioning system (GPS) tracker for locating the plier stapler, and an anvil having a clencher for receiving the staples and clutching the legs of the staples. The stapler obviates the need to use air compressors to apply staples.

Referring initially to the drawings, FIG. 1 illustrates a perspective view of one potential embodiment of battery-operated plier stapler of the present invention in accordance with the disclosed architecture. The battery-operated plier stapler 100 of the present invention is a plier stapler combination that uses a rechargeable battery for providing power for accurately applying staples onto a variety of surfaces. As a result, the plier stapler 100 does not use air compression as used in conventional pneumatic plier staplers. More specifically, the plier stapler 100 has a battery slot 102 positioned on the rear vertical handle 104 of the stapler 100. A rechargeable battery 106 is removably secured to the battery slot 102 for providing electric power to the stapler 100 for driving staples into a surface.

The plier stapler 100 has a trigger 108 positioned at the bottom of the middle handle 110 for activating the stapler 100 and initiating transmission of electric power from the battery 106 to the piston driver mechanism of the stapler 100. Upon pushing the trigger 108, the stapler 100 is activated for accurately applying staples onto a variety of surfaces. A magazine 112 is configured to hold a plurality of staples 1120 used for applying to a surface. The magazine 112 can be adapted for use with various types of staples and is made of a metal or steel. Further, the magazine 112 is removable and can be refilled with staples 1120. A pair of springs 114 (shown in FIG. 2A) is positioned inside the magazine 112 for pushing, i.e. spring biasing, the staples 1120 one-by-one for driving from an internal piston onto an anvil's clencher 116. The anvil 118 is configured to receive and clinch the legs of a staple after passing through the sheets/surface being stapled. The anvil 118 is coupled to the bottom 1040 of the rear vertical handle 104 with any suitable fasteners, such as screws, rivets, adhesives, etc. (not shown).

The magazine 112 is secured through an opening 1042 disposed in the rear vertical handle 104 and is secured to the back side of the nose or sleeve 124 for pushing or spring biasing the staples from the magazine to a target surface via the anvil's clencher 116. It should be noted that the plier stapler 100 can be used for applications including, but not limited to, carton packaging, end caps, corrugated trays, inserts, die-cuts, and more.

A laser sight 122 is positioned on the nose or sleeve 124 of the piston or driver housing 120 for indicating precise staple placement during application. The laser sight 122 eliminates the manual approximation by a user using the stapler 100 for applying staples to a variety of surfaces. The laser sight 122 is automatically activated when the trigger 108 is pressed by a user and is powered by the rechargeable battery 106.

The plier stapler 100 does not use pneumatic air pressure for operation and therefore is easy to use even on hard surfaces, for example, when stapling 100-150 sheets of paper, cardboard, or upholstery fabric. Further, the plier stapler 100 can come in various configurations and designs with the rechargeable battery and the laser sight included in all the possible embodiments of the present invention.

Figure 2A:
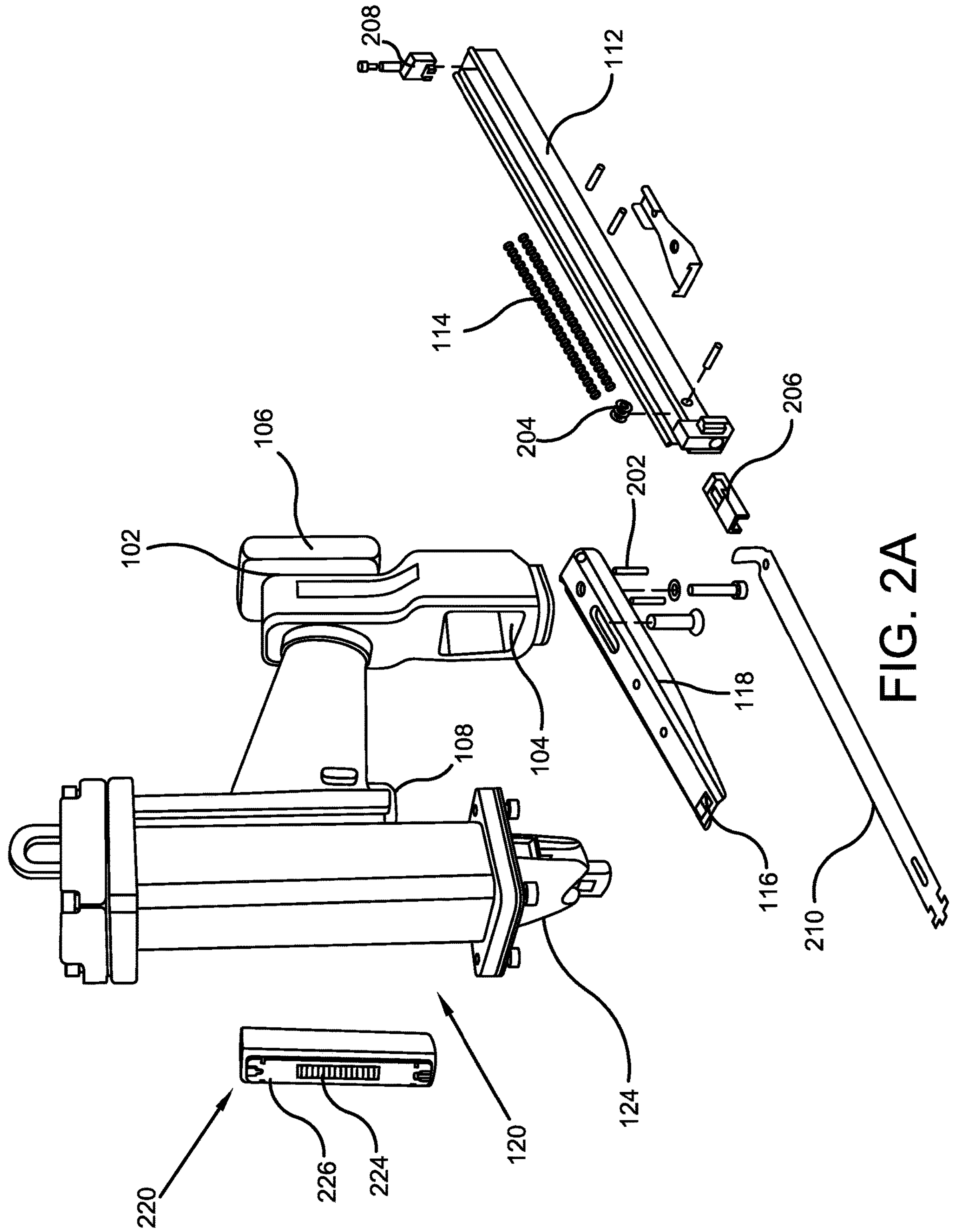
FIG. 2A illustrates an exploded view of the battery-operated plier stapler of FIG. 1 in accordance with the disclosed architecture.

FIG. 2A illustrates an exploded view of the battery-operated plier stapler 100 of FIG. 1 in accordance with the disclosed architecture. The anvil 118 is secured with roll pin 202 and bolts the clencher 116 for clinching legs of a staple to staple a surface. The clencher 116 is positioned below the nose or sleeve 124 such that the laser sight 122 is positioned on the clencher 116 during operation of the stapler 100. The clincher 116 is slightly tapered, forms the base of the stapler 100 and helps in clutching legs of staples inwards for completing the stapling process.

The magazine 112 uses the pair of springs 114 with associated rollers 204 and a pusher 206 for pushing the staples (i.e. biasing forward) for the operation. A block catch 208 holds cover 210 open for installing staples. The magazine 112 is covered by a cover 210 that is removably mounted on the magazine 112 and is used for securing the springs 114, staples 1120, and rollers 204 positioned inside the magazine 112.

The battery slot 102 is positioned on the rear vertical arm 104 wherein a rechargeable battery 106 can be installed into the battery slot 102 as described in FIG. 1. The power contacts 214 (FIG. 4) connects the battery contacts 402 to the internal wiring of the stapler 100 and is used for providing power for operation of the stapler 100. The trigger 108 is mounted to middle handle 110 and is used for actuating the stapler.

The driver piston assembly or housing 120 includes a driver piston coupled to a driver which is coupled to a motor assembly 220. The driver is powered by the battery 106 positioned in the battery slot 102 and therefore does not use pneumatic air pressure. The motor and circuit board 224 is used for precise staple operation of the stapler 100 and is positioned inside the electronic assembly 226. The driver piston 120 includes the driver having a trigger assembly and a trigger safety.

Figure 2B:
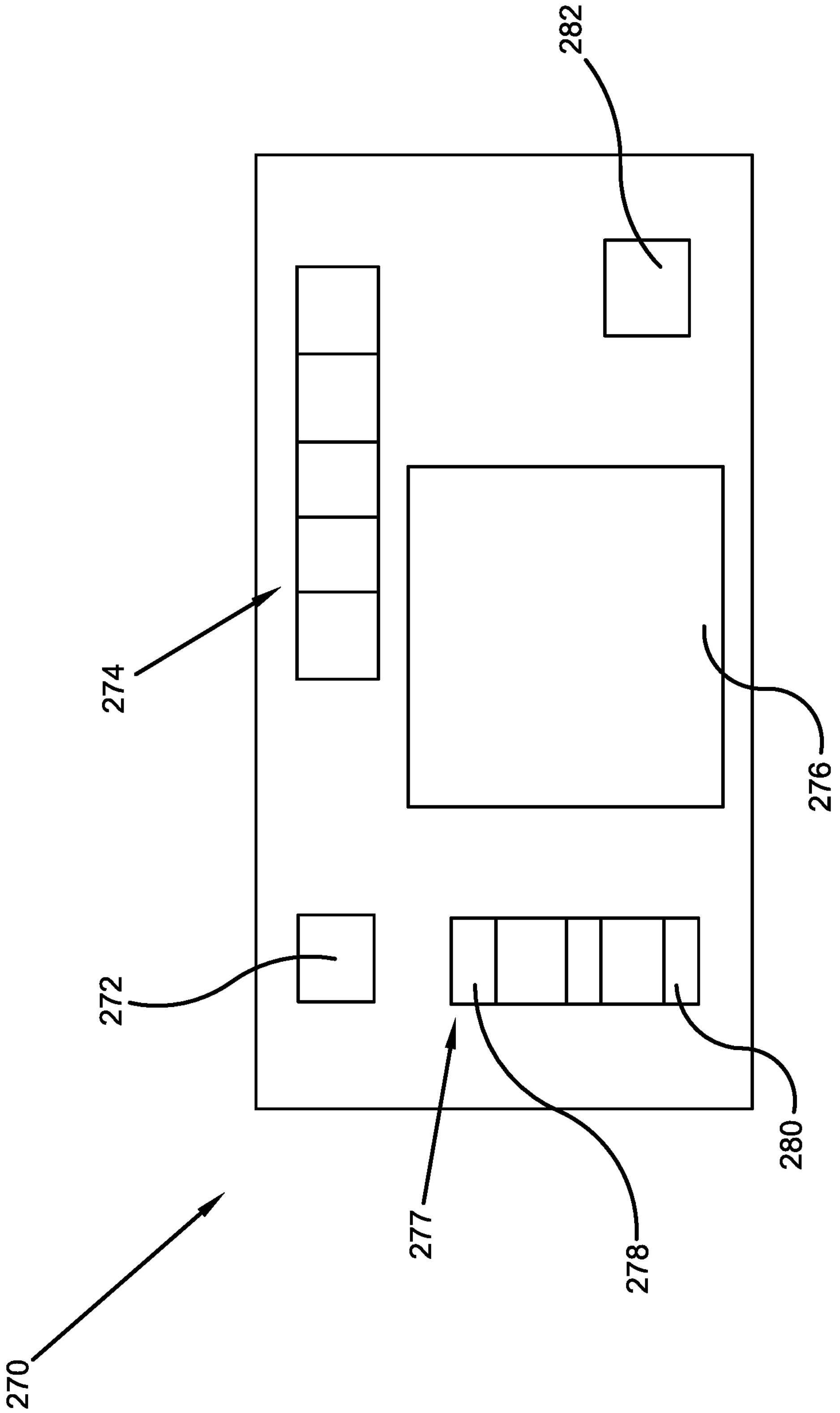
FIG. 2B illustrates a detailed view of a control board used for operating the stapler of the present invention in accordance with the disclosed architecture.

FIG. 2B illustrates an exemplary control board 270 to receive input from an operator and provide status indicators to the operator, including electronic controls of the stapler 100. The control board 270 comprising a start/stop button 272 is configured to activate and deactivate the stapler 100. A battery indicator 274 configured for displaying a battery charge. An electronic trigger 276 for actuating the stapler 100. A stapler quantity indicator 277 configured for displaying the quantity of staples loaded in the stapler 100. The stapler quantity indicator 277 can show a full quantity 278 and an empty quantity 280. It is to be appreciated that the control board 270 is coupled to the stapler 100 through a wiring harness and battery connection. Further, the control board 270 can also include a warning signal 282 indicating any malfunctioning in the stapler 100.

Figure 3:
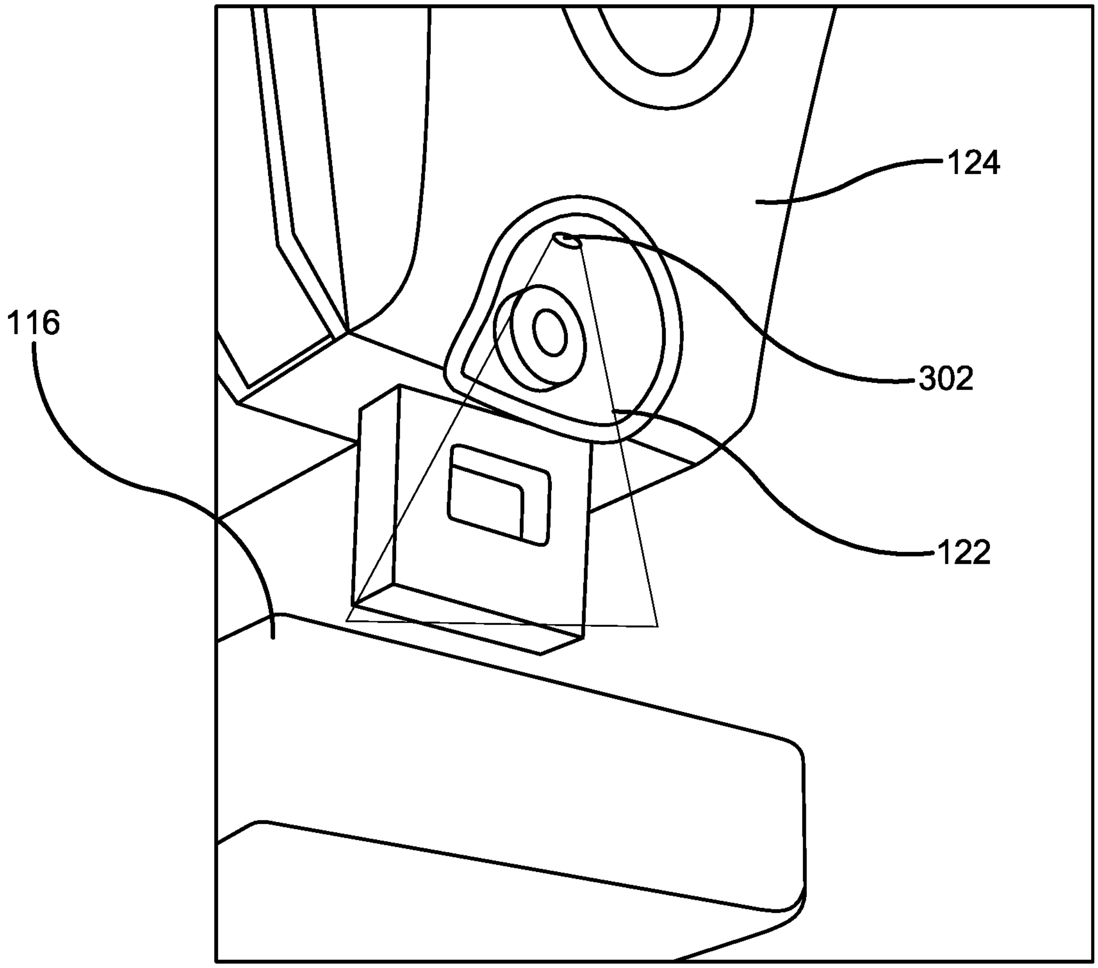
FIG. 3 illustrates an enlarged view of the laser sight used in the plier stapler of the present invention in accordance with the disclosed architecture.

FIG. 3 illustrates an enlarged view of the laser sight used in the plier stapler of the present invention in accordance with the disclosed architecture. The laser sight 122 is configured to be projected onto a target surface such that the laser sight 122 indicates correct staple placement during use of the stapler 100. The laser sight 122 is projected by a laser source 302 positioned in the nose or sleeve 124 and the laser source 302 receives electric power from the rechargeable battery positioned on the stapler 100.

The laser sight 122 is continuous and does not flicker. Further, the laser sight 122 can be of any primary color, preferably red color. It should be appreciated that the laser sight 122 eliminates incorrect staple placement and reduces wastage of staples and process of removing incorrectly placed staples.

Figure 4:
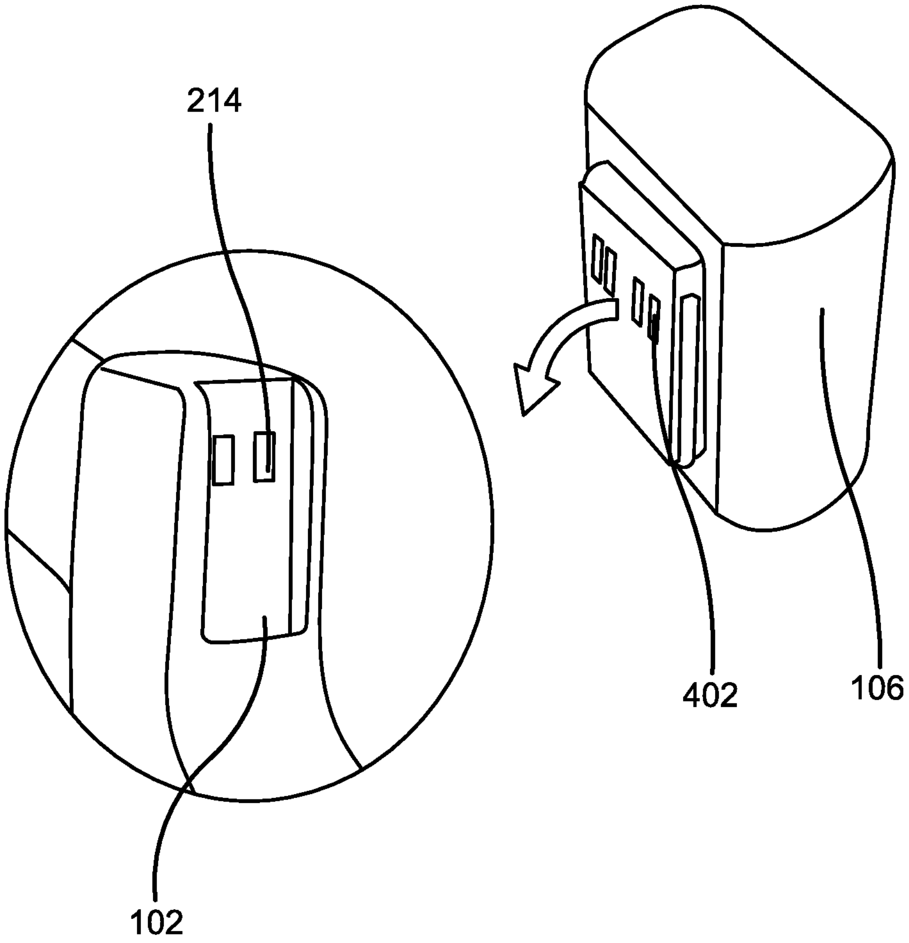
FIG. 4 illustrates an enlarged view showing a process of placement of a rechargeable battery into the battery socket for providing power to the plier stapler in accordance with the disclosed architecture.

FIG. 4 illustrates an enlarged view showing a process of placement of a rechargeable battery in the battery socket for providing power to the plier stapler in accordance with the disclosed architecture. The battery slot or socket 102 has power contacts or circuit connector 214 in the form of charging pins that are compatible to any conventional rechargeable battery 106 available for fastening tools. During connection, the battery contacts or charging pins 402 of the battery 106 are coupled to the power contacts 214 of the battery slot or socket 102 to complete an electric connection and enabling the battery 106 to provide electric power to the stapler 100. The rechargeable battery can power a built-in global positioning system (GPS) tracker, not illustrated, for locating the plier stapler when misplaced at a worksite.

The stapler of various embodiments of the present invention is compatible with up to 12V, 5.0 Ah high-performance Li-Ion battery that can fire up to 10000 staples per charge. A plurality of batteries come along with the stapler 100 and each battery 106 has a high energy density and can operate longer between charges with no self-discharge and no memory effect. The stapler 100 provides a staple cycle speed of about 500 ms.

In one embodiment, the battery operated plier stapler of the present invention comes as a kit that includes the stapler, two 12V Li-on battery packs, a charger for recharging the battery packs and a pack of 10,000 staples. The battery operated plier stapler can come in various designs, sizes, and configurations to meet requirements of users. Further, the stapler is cordless and does not require any air or external power supply for operation, making the use effective, easy, and quick.

Figure 5:
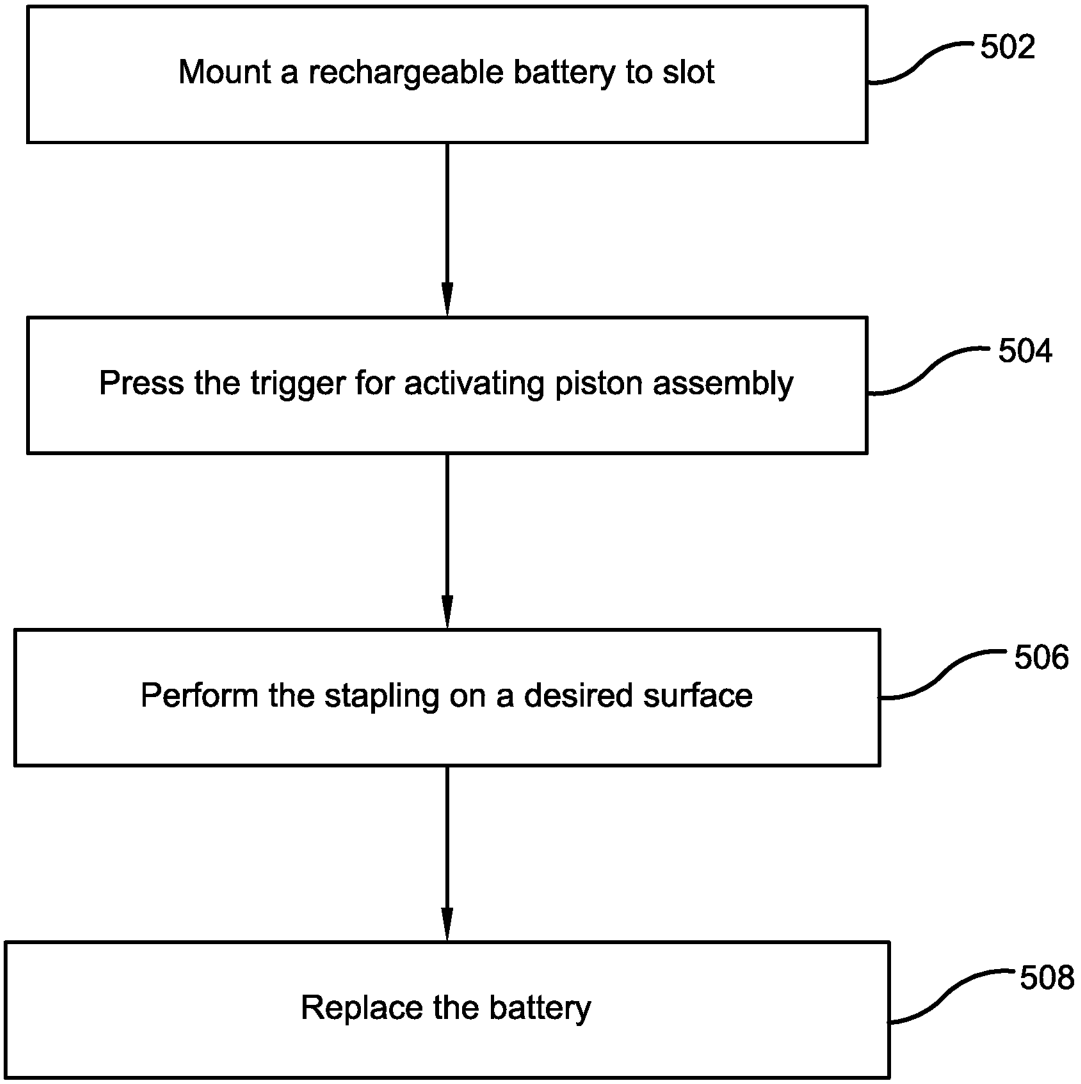
FIG. 5 illustrates a flow diagram illustrating exemplary steps performed in using the battery-operated plier stapler of the present invention in accordance with the disclosed architecture.

FIG. 5 illustrates a flow diagram illustrating exemplary steps performed in using the battery-operated plier stapler of the present invention in accordance with the disclosed architecture. Initially, an operator of the stapler installs a rechargeable battery to the battery slot or socket of the stapler for providing electric power to the stapler (Step 502).

Then, the trigger positioned on the stapler is pressed by the operator to activate the power supply, the laser sight, and the driver piston assembly of the stapler (Step 504). The stapling process is performed on a desired surface (Step 506). Finally, the battery can be replaced with a new battery in case the battery is exhausted (Step 508). The only time the stapler device engages is when the trigger is pressed.

The plier stapler of various embodiments of the present invention allows users to perform stapling process easily and accurately. Elimination of use of compressed air reduces cost of the stapling process while increasing the accuracy. The plier stapler is cordless and lightweight and features several rechargeable battery packs that can be secured to the plier stapler to power the internal piston driver mechanism, Certain terms are used throughout the following description and claims to refer to particular features or components. As one skilled in the art will appreciate, different persons may refer to the same feature or component by different names. This document does not intend to distinguish between components or features that differ in name but not structure or function. As used herein "plier stapler," "battery-operated plier stapler," "electric plier stapler," "stapler," and "non-pneumatic electric plier stapler" are interchangeable and refer to the battery-operated plier stapler device 100 of the present invention.

Notwithstanding the forgoing, the battery-operated plier stapler device 100 of the present invention can be of any suitable size and configuration as is known in the art without affecting the overall concept of the invention, provided that it accomplishes the above stated objectives. One of ordinary skill in the art will appreciate that the battery-operated plier stapler device 100 as shown in the FIGS. are for illustrative purposes only, and that many other sizes and shapes of the battery-operated plier stapler device 100 are well within the scope of the present disclosure. Although the dimensions of the battery-operated plier stapler device 100 important design parameters for user convenience, the battery-operated plier stapler device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A battery-operated plier stapler comprising:

a battery slot comprising a pair of power contacts and a rechargeable battery comprising a pair of charging pins configured to engage the pair of power contacts of the battery slot for providing an electric power for accurately applying a plurality of staples onto a target surface;

a magazine configured to hold the plurality of staples, wherein said magazine is selectively removable for refilling with said plurality of staples;

a magazine cover removably mounted to the magazine;

a block catch for holding the magazine cover in an open position to load the magazine;

a laser sight positioned on a sleeve of a driver piston mechanism of said plier stapler for indicating a precise staple placement during a staple application;

a trigger positioned at a bottom of a handle of said plier stapler for initiating a transmission of said electric power from said rechargeable battery and actuating said laser sight and said plier stapler;

wherein said driver piston mechanism pushes said plurality of staples from said magazine to said target surface; and a nose;

an anvil secured with a roll pin; and a clencher for clinching a pair of legs of each of said plurality of staples; and wherein said magazine comprises a pair of springs, a plurality of rollers, and a pusher positioned inside said magazine for biasing said plurality of staples forward to said driver piston of said plier stapler.

2. The battery-operated plier stapler of claim 1, wherein said clencher is positioned on a front side of said nose such that said laser sight is positioned on said clencher during operation of said plier stapler.

3. The battery-operated plier stapler of claim 2, wherein said clencher is tapered and forms a base of said plier stapler for clutching the pair of legs of each of said plurality of staples inwards for completing the stapling process.

4. The battery-operated plier stapler of claim 3, wherein said laser sight is powered by said rechargeable battery and is automatically activated when said trigger is pressed by a user.

5. The battery-operated plier stapler of claim 4, wherein said battery slot is positioned on a rear vertical handle of said plier stapler.

6. The battery-operated plier stapler of claim 5, wherein said rechargeable battery is removably secured in said battery slot.

7. The battery-operated plier stapler of claim 6, wherein said magazine is adaptable for use with various sizes of staples.

8. The battery-operated plier stapler of claim 7, wherein said magazine is comprised of a metal.

9. A battery-operated plier stapler comprising:

a battery slot and a rechargeable battery for providing an electric power for accurately applying a plurality of staples onto a target surface;

a magazine configured to hold the plurality of staples, wherein said magazine is selectively accessed for refilling said plurality of staples;

a laser sight positioned on a nose of a housing mechanism of said plier stapler for indicating a precise staple placement during application;

a trigger positioned at a bottom of a handle of said plier stapler for initiating transmission of said electric power from said rechargeable battery and actuating said laser sight and said plier stapler;

a driver piston mechanism for pushing said plurality of staples from said magazine to said target surface;

wherein said magazine comprises a pair of springs, a plurality of rollers, and a pusher positioned inside said magazine for biasing said plurality of staples forward to said driver piston of said plier stapler;

an anvil;

a clencher for clinching a pair of legs of each of said plurality of staples to staple the target surface, wherein said clencher is positioned below said nose such that said laser sight is positioned on said clencher during operation of said plier stapler; and a control board electronically coupled to the battery-operated plier stapler, the control board comprising a start/stop button, a battery charge indicator, a staple quantity indicator, and a malfunction indicator.

10. The battery-operated plier stapler of claim 9, wherein said clencher is tapered and forms a base of said plier stapler for clutching the pair of legs of each of said plurality of staples inwards for completing the stapling process.

11. The battery-operated plier stapler of claim 10, wherein said laser sight is powered by said rechargeable battery and is automatically activated when said trigger is pressed by a user.

12. The battery-operated plier stapler of claim 11, wherein said battery slot is positioned on a rear vertical handle of said plier stapler.

13. The battery-operated plier stapler of claim 12, wherein said rechargeable battery is removably secured in said battery slot.

14. The battery-operated plier stapler of claim 13, wherein said magazine is adaptable for use with various sizes of staples.

15. A battery-operated plier stapler comprising:

a battery slot and a rechargeable battery for providing an electric power for accurately applying a plurality of staples onto a target surface;

a magazine configured to hold the plurality of staples until applied to the target surface, wherein said magazine is selectively removable for refilling said plurality of staples as needed;

a magazine cover removably mounted to the magazine;

a block catch for holding the magazine cover in an open position to load the magazine;

a laser sight positioned on a front side of a nose of said plier stapler for indicating a precise staple placement during application;

wherein said laser sight is continuous and is projected by a laser source positioned in said nose and said laser source receives said electric power from said rechargeable battery;

a trigger positioned at a bottom of a handle of said plier stapler for initiating transmission of said electric power from said rechargeable battery and actuating said laser sight and said plier stapler;

a driver piston mechanism for pushing each of said plurality of staples from said magazine to said target surface, wherein said magazine includes a pair of springs positioned inside said magazine for biasing said plurality of staples forward to said driver piston of said plier stapler;

an anvil secured with a roll pin;

a clencher for clinching a pair of legs of each of said plurality of staples to staple the target surface; and wherein said clencher is positioned below said nose such that said laser sight is positioned on said clencher during operation of said plier stapler; and a control board electronically coupled to the battery-operated plier stapler, the control board comprising a start/stop button, a battery charge indicator, a staple quantity indicator, and a malfunction indicator; and wherein said magazine comprises a pair of springs, a plurality of rollers, and a pusher positioned inside said magazine for biasing said plurality of staples forward to said driver piston of said plier stapler; and wherein said battery-operated plier stapler is configured with a staple cycle speed of 500 ms.

16. The battery-operated plier stapler of claim 15, wherein said clencher is tapered and forms a base of said plier stapler for clutching the pair of legs of each of said plurality of staples inwards for completing the stapling process.

17. The battery-operated plier stapler of claim 16, wherein said battery slot is positioned on a rear vertical handle of said plier stapler.

18. The battery-operated plier stapler of claim 17, wherein said rechargeable battery powers a built-in GPS tracker for locating said plier stapler.

19. The battery-operated plier stapler of claim 18, wherein said magazine is adaptable for use with various sizes of staples.

* * * * *